United States Patent
Trainer et al.

(10) Patent No.: US 12,515,809 B2
(45) Date of Patent: Jan. 6, 2026

(54) ELECTRICALLY STARTING A GAS TURBINE ENGINE

(71) Applicant: ROLLS-ROYCE plc, London (GB)

(72) Inventors: David R. Trainer, Derby (GB); Mark Sweet, Chesterfield (GB); Matthew S. Cartwright, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/672,921

(22) Filed: May 23, 2024

(65) Prior Publication Data

US 2025/0187743 A1    Jun. 12, 2025

(30) Foreign Application Priority Data

Jun. 19, 2023 (GB) .................... 2309160

(51) Int. Cl.
| | |
|---|---|
| *B64D 33/00* | (2006.01) |
| *B64D 27/10* | (2006.01) |
| *F02C 7/26* | (2006.01) |
| *H02P 9/08* | (2006.01) |
| *H02P 101/25* | (2016.01) |
| *H02P 101/30* | (2015.01) |
| *H02P 103/20* | (2016.01) |

(52) U.S. Cl.
CPC ............ *B64D 33/00* (2013.01); *B64D 27/10* (2013.01); *F02C 7/26* (2013.01); *H02P 9/08* (2013.01); *B64D 2221/00* (2013.01); *F05D 2260/85* (2013.01); *H02P 2101/25* (2015.01); *H02P 2101/30* (2015.01); *H02P 2103/20* (2015.01)

(58) Field of Classification Search
CPC .......... B64D 33/00; B64D 27/10; H02P 9/08; H02P 2101/25; H02P 2101/30; H02P 2103/20; F05D 2260/85; F02C 7/26
See application file for complete search history.

(56) References Cited

U.S. PATENT DOCUMENTS

| | | |
|---|---|---|
| 9,422,905 B2 | 8/2016 | Anastasio et al. |
| 2006/0042267 A1 | 3/2006 | Thompson |
| 2014/0197681 A1 | 7/2014 | Iwashima et al. |

(Continued)

FOREIGN PATENT DOCUMENTS

EP    3 832 827 A1    6/2021

OTHER PUBLICATIONS

U.S. Appl. No. 18/672,887, filed May 23, 2024 in the name of Trainer et al.

(Continued)

*Primary Examiner* — Sean Gugger
(74) *Attorney, Agent, or Firm* — Oliff PLC

(57) ABSTRACT

An aircraft power and propulsion system includes a gas turbine engine having first and second spools, the first spool being a starting spool; first and second DC electrical networks having first and second operating voltages; a first electrical machine joined with the first spool, the first electrical machine having first and a second winding sets; a second electrical machine joined with the second spool; a first, second and third AC:DC converter; and a controllable switching arrangement configured so that a connection to an AC-side of the third AC:DC converter is switchable between a winding of the second electrical machine or the second DC electrical network via an inductor.

20 Claims, 9 Drawing Sheets

(56) References Cited

U.S. PATENT DOCUMENTS

| | | |
|---|---|---|
| 2016/0039371 A1 | 2/2016 | Blumer et al. |
| 2016/0208709 A1 | 7/2016 | Huang |
| 2017/0264178 A1 | 9/2017 | Stauder et al. |
| 2019/0181786 A1 | 6/2019 | Singh et al. |
| 2020/0083831 A1* | 3/2020 | Rozman .......... H02M 7/10 |
| 2021/0167597 A1* | 6/2021 | Gritsch .......... H02J 1/102 |
| 2021/0172382 A1 | 6/2021 | Bruce |
| 2021/0347491 A1* | 11/2021 | Delbosc .......... B64D 27/24 |
| 2022/0049658 A1 | 2/2022 | Bruce et al. |
| 2023/0123533 A1 | 4/2023 | Chivite Zabalza et al. |

OTHER PUBLICATIONS

Dec. 15, 2023 Search Report issued in United Kindgom Patent Application No. 2309160.6.
Dec. 7, 2023 Search Report issued in United Kingdom Patent Application No. 2308720.8.
Oct. 17, 2024 Extended Search Report issued in European Patent Application No. 24176929.8.
May 7, 2025 Notice of Allowance issued in U.S. Appl. No. 18/672,887.

* cited by examiner

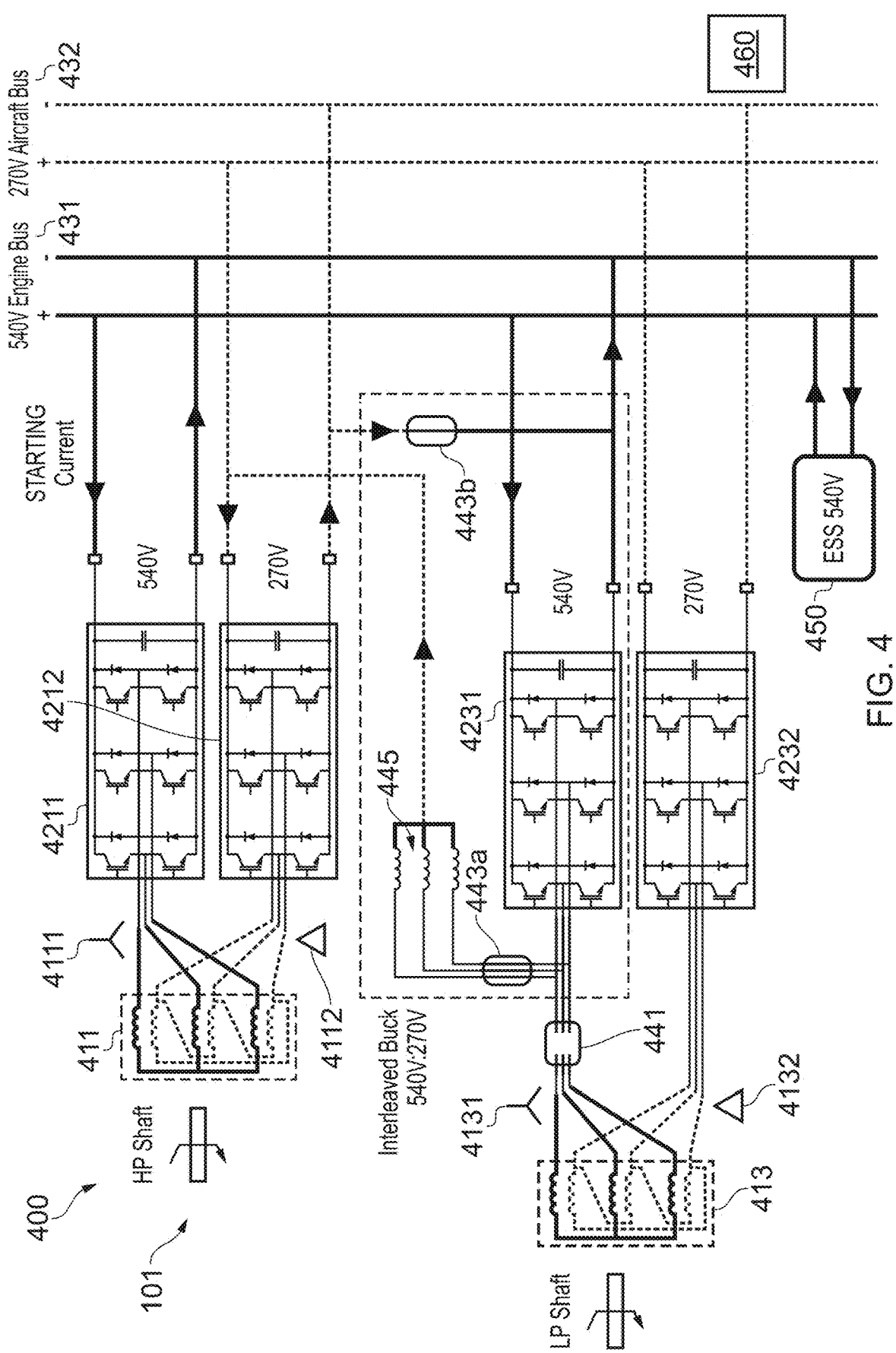

ELECTRICALLY STARTING A GAS TURBINE ENGINE

CROSS-REFERENCE TO RELATED APPLICATIONS

This specification is based upon and claims the benefit of priority from United Kingdom Patent Application No. 2309160.6, filed on 19 Jun. 2023, the entire contents of which are incorporated herein by reference.

TECHNICAL FIELD

The disclosure relates to an electrical power system for electrically starting a gas turbine engine and to methods of electrically starting a gas turbine engine.

BACKGROUND

One way of starting an aircraft gas turbine engine uses a so-called electric starter-generator. A starter-generator includes a rotary electrical machine that is mechanically coupled to a starting spool (e.g., a high-pressure (HP) or intermediate-pressure (IP) spool) of the gas turbine engine. During normal operation of the gas turbine engine, the starter-generator is operated in a generator mode and extracts mechanical power from the spool to generate electrical power for use in the engine and airframe. However, the starter-generator can also be used to start or restart the gas turbine engine, by operating in a motor mode. The electrical machine is supplied with electrical power from a power source, for example ground equipment, an auxiliary power unit (APU) or an on-board energy storage system (ESS), from which the electrical machine produces a torque that drives rotation of the starting spool. The combustion equipment of the gas turbine engine is ignited when the starting spool reaches a rotational speed sufficient to provide adequate airflow through the engine core.

Weight is a key consideration in aircraft. For a starter-generator, it is necessary to include the electrical machine, whose weight will generally increase with the torque rating of the machine. Most starter-generator systems will also include one or more power electronics converters, for example AC:DC converters, AC-AC converters and/or DC:DC converters depending on the implementation. The weight of a power converter generally increases with the output power and current ratings of the converter. In many cases, the ratings of the components of a starter-generator, and therefore also their weight, are dictated by the starting requirements because the operating torque and current are generally lower when operating in the generator mode. It would be advantageous to reduce the required ratings of components of a starter-generator, as this may lead to weight reductions and efficiency improvements.

United States Patent Application Publication US 2022/0049658 A1 describes a way of reducing the required torque rating of the electrical machine of a starter-generator. The torque rating of the electrical machine is selected to be lower than the starting torque of the starting spool. The difference between the starting torque and torque rating of the electrical machine is supplied by operating the permanent magnet alternator (PMA) of the engine as a motor. The PMA is a small electrical generator included in many aircraft, dedicated to generating power for the aircraft's safety-critical controller (e.g., a FADEC), and is conventionally not used in a motor mode.

SUMMARY

The present disclosure provides aircraft power and propulsion systems in which output current ratings of AC:DC power converters used to supply a starting current to a starter-generator may be reduced. In other embodiments, output current ratings of AC:DC power converters may not be changed, but a higher starting torque may be available without additional electrical machine weight. The disclosed systems may also be useful where electrical starting power is provided at medium voltage (e.g., a ground-based power supply at 270 $V_{DC}$) and engine starting power is needed at a higher voltage (e.g., 540 $V_{DC}$), or where electrical starting power is required at multiple DC voltages (e.g., 540V and 270V). The systems may, for example, avoid the need for a dedicated, isolated DC:DC converter for an on-board ESS.

According to a first aspect, there is provided an aircraft power and propulsion system, comprising:
- a gas turbine engine having a first spool and a second spool, the first spool being a designated starting spool;
- a first DC electrical network having a first operating voltage;
- a second DC electrical network having a second operating voltage different from the first operating voltage;
- a first electrical machine mechanically coupled with the first spool, the first electrical machine having a first winding set and a second winding set;
- a second electrical machine mechanically coupled with the second spool;
- a first AC:DC converter, wherein an AC-side of the first AC:DC converter is connected to the first winding set of the first electrical machine, and a DC-side of the first AC:DC converter is connected to the first DC electrical network;
- a second AC:DC converter, wherein an AC-side of the second AC:DC converter connected to the second winding set of the first electrical machine, and a DC-side of the second AC:DC converter connected to the second DC electrical network;
- a third AC:DC converter, a DC-side of the third AC:DC converter connected to the first DC electrical network;
- a controllable switching arrangement configured so that a connection to an AC-side of the third AC:DC converter is switchable between:
  - a winding of the second electrical machine; and
  - the second DC electrical network via an inductor.

When the AC-side of the third AC:DC converter is connected to the winding of the second electrical machine, the second electrical machine and third AC:DC converter are configured to extract power from the second spool in a generator mode or drive rotation of the second spool in a motor mode When the AC-side of the third AC:DC converter is connected to the second DC electrical network via the inductor, the third AC:DC converter and inductor are configured to operate as a DC:DC converter for receiving DC power from the first DC electrical network at the first operating voltage and supplying DC power to the second DC electrical network at the second operating voltage The first electrical machine may be rated to produce at least a rated starting torque, $\tau_{start}$, of the engine; and a current required by the first winding set of the first electrical machine to produce the starting torque may be greater than a rated current output of the first AC:DC converter.

The aircraft power and propulsion system may comprise a control system. The control system may have roles including controlling the state of the switching arrangement and controlling switching states of semiconductor switches (e.g., MOSFETs) of the power converters. The control system may be a single controller or multiple, distributed controllers. The control system may be implemented in hardware, software or a mix of hardware and software. The controller may be an engine electronic controller (EEC), for example a full-authority digital engine controller (FADEC).

The control system may be configured to: in response to a request to start or restart the gas turbine engine, control the switching arrangement to disconnect the AC-side of the third AC:DC converter from the winding of the second electrical machine and to connect the AC-side of the third AC:DC converter to the second DC electrical network; and operate the third AC:DC converter and inductor as a DC:DC converter.

The control system may be configured to: following an engine start or restart, stop current flow through the third AC:DC converter by controlling a switching state of one or more transistors of the third AC:DC converter; and after stopping current flow through the third AC:DC converter, controlling the switching arrangement to disconnect the AC-side of the third AC:DC converter from the second DC electrical network and the inductor, and to connect the AC-side of the third AC:DC converter to the winding of the second electrical machine.

The first operating voltage may be greater than the second operating voltage, and the third AC:DC converter may be operable as a buck-mode DC:DC converter.

The first operating voltage may be lower than the second operating voltage, and the third AC:DC converter may be operable as a boost-mode DC:DC converter.

The first and second operating voltages differ by a factor of between 1.5 and 2.5. In one example, the first operating voltage is 540 V DC and the second operating voltage is 270 V DC. However, any differing operating voltages may be used accorded to design requirements and preferences.

The first and second windings sets of the first electrical machine may be configured to have different AC voltages at their terminals.

The first winding set of the first electrical machine may have a first number of turns, and the second winding set of the first electrical machine may have a second number of turns different from the first number of turns. For example, the first number may be up to 100% greater (e.g., 100% greater) than the second number. In an example, the first number is between 10% and 75% greater than the second number. In other example, the first and second numbers of turns are the same.

The first winding set of the first electrical machine may be connected in a star configuration, and the second winding set of the first electrical machine connected in a delta configuration.

The first and second winding sets may be provided on a common stator of the electrical machine. In some examples the first winding set is disposed in a first circumferential span around the stator and the second winding set is disposed in a second circumferential span around the stator. In some examples the first and second circumferential spans are non-overlapping. In some examples the first circumferential span is greater than the second circumferential span.

The winding of the second electrical machine may be a first winding set of the second electrical machine; and the second electrical machine may further comprise a second winding set. The aircraft power and propulsion system may further comprise a fourth AC:DC converter, wherein an AC-side of the fourth AC:DC converter is connected to the second winding set of the second electrical machine, and a DC-side of the fourth AC:DC converter is connected to the second DC electrical network.

The first winding set of the second electrical machine may have a first number of turns, and the second winding set of the second electrical machine may have a second number of turns different from the first number of turns.

The first winding set of the second electrical machine may be connected in a star configuration, and the second winding set of the second electrical machine in a delta configuration.

The inductor may be any inductive load. In some embodiments, the inductor comprises one or more coils. In another group of embodiments, the inductor is a transformer having a first winding and a second winding.

The controllable switching arrangement may be configured so that: the connection to the AC-side of the third AC:DC converter is switchable between the first winding set of the second electrical machine and the first winding of the transformer; and the connection to the AC-side of the fourth AC:DC converter is switchable between the second winding set of the second electrical machine and the second winding of the transformer.

The control system may be configured to, in response to a request to start or restart the gas turbine engine: control the switching arrangement to disconnect the AC-side of the third AC:DC converter from the first winding set of the second electrical machine and to connect the AC-side of the third AC:DC converter to the first winding of the transformer; control the switching arrangement to disconnect the AC-side of the fourth AC:DC converter from the second winding set of the second electrical machine and to connect the AC-side of the fourth AC:DC converter to the second winding of the transformer; and operate the third AC:DC converter, the fourth AC:DC converter and the transformer as a DC:DC converter.

The control system may be configured to: following an engine start or restart, stop current flow through the third and fourth AC:DC converters by controlling a switching state of one or more transistors of each of the third and further AC:DC converters; and after stopping current flow through the third and fourth AC:DC converters: controlling the switching arrangement to disconnect the AC-side of the third AC:DC converter from the first winding of the transformer and to disconnect the AC-side of the fourth AC:DC converter from the second winding of the transformer; and controlling the switching arrangement to connect the AC-side of the third AC:DC converter to the first winding set of the second electrical machine and to connect the AC-side of the fourth AC:DC converter to the second winding set of the second electrical machine.

The gas turbine engine may be a two-spool gas turbine engine. The first spool may be a high-pressure (HP) spool, and the second pool a low-pressure (LP) spool.

The gas turbine engine may be a three-spool gas turbine engine. The first spool may be an HP spool, and the second pool an intermediate-pressure (IP) spool or LP spool. Alternatively, the first spool may be an IP spool, and the second pool an LP spool.

The aircraft power and propulsion system may further comprise an ESS connected to and configured to supply electrical power to one of the first and second DC electrical networks. The ESS may include a battery.

The controllable switching arrangement may include mechanical switches such as contactors (e.g., 3-phase contactors) or semiconductor switches (e.g., solid state circuit breakers (SSCBs)).

Each respective electrical machine may be a permanent magnet synchronous electrical machine. The respective winding sets may be stator windings. Any suitable machine type may be used, however, for example reluctance machines (switched and synchronous), induction and wound field type machines.

Each of the AC:DC power electronics converters may be a bi-directional AC:DC converter (e.g., may be operable as an inverter or as a rectifier). Any suitable converter circuit may be used, for example a two-level AC:DC converter circuit (e.g., two-level, three-phase) or H-bridge circuits.

According to another aspect, there is an aircraft comprising an aircraft power and propulsion system according to the first aspect.

According to another aspect, there is a method of starting a gas turbine engine of the aircraft power and propulsion system of the first aspect. The method comprises: receiving, by a control system of the power and propulsion system, a request to start or restart the gas turbine engine; controlling the switching arrangement to disconnect the AC side of the third AC:DC converter from the winding of the second electrical machine and to connect the AC side of the third AC:DC converter to the second DC electrical network; supplying electrical power from one or more electrical power sources to the first DC electrical network; and supplying electrical power from the first DC electrical network to the first winding set of the first electrical machine via the first AC:DC converter; supplying electrical power from the first DC electrical network to the second winding set of the first electrical machine via the second AC:DC converter by operating the third AC:DC converter and the inductor as a DC:DC converter that converts DC electrical power supplied by the first DC electrical network at the first operating voltage to DC electrical power at the second operating voltage.

According to another aspect, there is provided a method of starting a gas turbine engine of the aircraft power and propulsion system of the first aspect, in which the second electrical machine has a second winding set, there is a fourth AC:DC converter, and the inductor is a transformer. The method comprises: receiving, by a control system of the power and propulsion system, a request to start or restart the gas turbine engine; controlling the switching arrangement to disconnect the AC side of the third AC:DC converter from the first winding set of the second electrical machine and to connect the AC side of the third AC:DC converter to the first winding of the transformer; controlling the switching arrangement to disconnect the AC side of the fourth AC:DC converter from the second winding set of the second electrical machine and to connect the AC side of the fourth AC:DC converter to the second winding of the transformer; supplying electrical power from one or more electrical power sources to the first DC electrical network; and supplying electrical power from the first DC electrical network to the first winding set of the first electrical machine via the first AC:DC converter; supplying electrical power from the first DC electrical network to the second winding set of the first electrical machine via the second AC:DC converter by operating the third AC:DC converter, the fourth AC:DC converter and the transformer as a DC:DC converter that converts DC electrical power supplied by the first DC electrical network at the first operating voltage to DC electrical power at the second operating voltage.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which:

FIG. 4 shows an example aircraft power and propulsion system, illustrating the operation of an idle AC:DC converter and inductor as a DC:DC converter to supply power to a winding set of an electrical machine coupled to a starting spool of a gas turbine engine;

DETAILED DESCRIPTION

Figure 1:
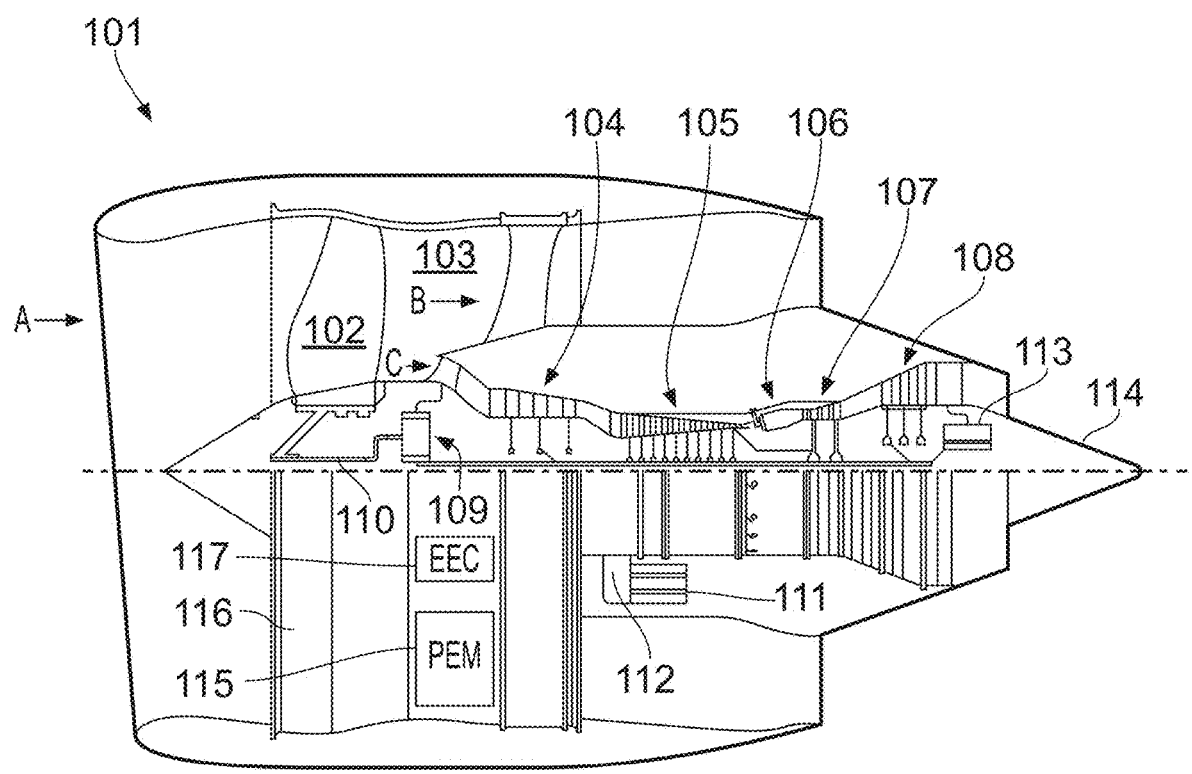
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure (LP) compressor 104, a high-pressure (HP) compressor 105, a combustor 106, an HP turbine 107, and a LP turbine 108.

In operation, the core flow C is compressed by the LP compressor 104 and is then directed into the HP compressor 105 where further compression takes place. The compressed air exhausted from the HP compressor 105 is directed into the combustor 106 where it is mixed with fuel and the mixture is combusted. The resultant hot combustion products then expand through, and thereby drive, the HP turbine 107 and in turn the low-pressure turbine 108 before being exhausted to provide a small proportion of the overall thrust.

The HP turbine 107 drives the HP compressor 105 via an interconnecting shaft. The LP turbine 108 drives the LP compressor 104 via another interconnecting shaft. Together, the HP compressor 105, HP turbine 107, and associated interconnecting shaft form part of a HP spool of the engine 101. Similarly, the LP compressor 104, LP turbine 108, and associated interconnecting shaft form part of a LP spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the LP turbine 108 via a reduction gearbox in the form of a planetary-configuration epicyclic gearbox 109. Thus in this configuration, the LP turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the LP turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the HP spool, for example by a core-mounted accessory drive 112 of conventional configuration. Such a configuration facilitates the generation of electrical power for the engine and the aircraft and the driving of the HP spool to facilitate starting of the engine in place of an air turbine starter. Other embodiments, including the one shown in FIG. 1, comprise both a first rotary electrical machine 111 coupled with the HP spool and a second rotary electrical machine 113 coupled with the LP spool. In addition to generating electrical power and the starting the engine 101, having both first and second rotary machines 111, 113, connected by power electronics, can facilitate the transfer of mechanical power between the HP and LP spools to improve operability, fuel consumption etc.

As mentioned above, in FIG. 1 the first rotary electrical machine 111 is driven by the HP spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the LP and HP compressors 104 and 105. In FIG. 1, the second electrical machine 113 is mounted in the tail cone 114 of the engine 101 coaxially with the turbomachinery and is coupled to the LP turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electrical machines 111 and 113. In this way, the EEC 117 may holistically respond to both thrust demand and electrical power demand.

To distribute electrical power to electrical loads associated with the engine and the airframe, an aircraft power and propulsion system includes one or more electrical networks. In the present disclosure only DC electrical networks are considered, though in general DC or AC networks may be used. At present, there is a trend towards increasing the distribution voltage, to support higher levels of power generation and to facilitate higher power loads. For this, voltage levels of $540V_{DC}$, or $+/-270V_{DC}$, have been proposed, although clearly different voltages, higher or lower, could be selected according to application requirements and preferences.

At the same time as increasing the operating voltage level, it may be beneficial to retain a lower voltage distribution network, e.g., 270 $V_{DC}$, particularly for powering airframe loads which generally have lower peak powers. This means providing at least two DC electrical networks. One option for providing, e.g., two electrical networks would be to include two electrical machines per spool, each electrical machine interfacing with one of the electrical networks. However, including two electrical machines per spool, including two full sets of electromagnetic active parts, adds weight. It may therefore be preferable to have a single electrical machine interfacing with two DC electrical networks.

Figure 2:
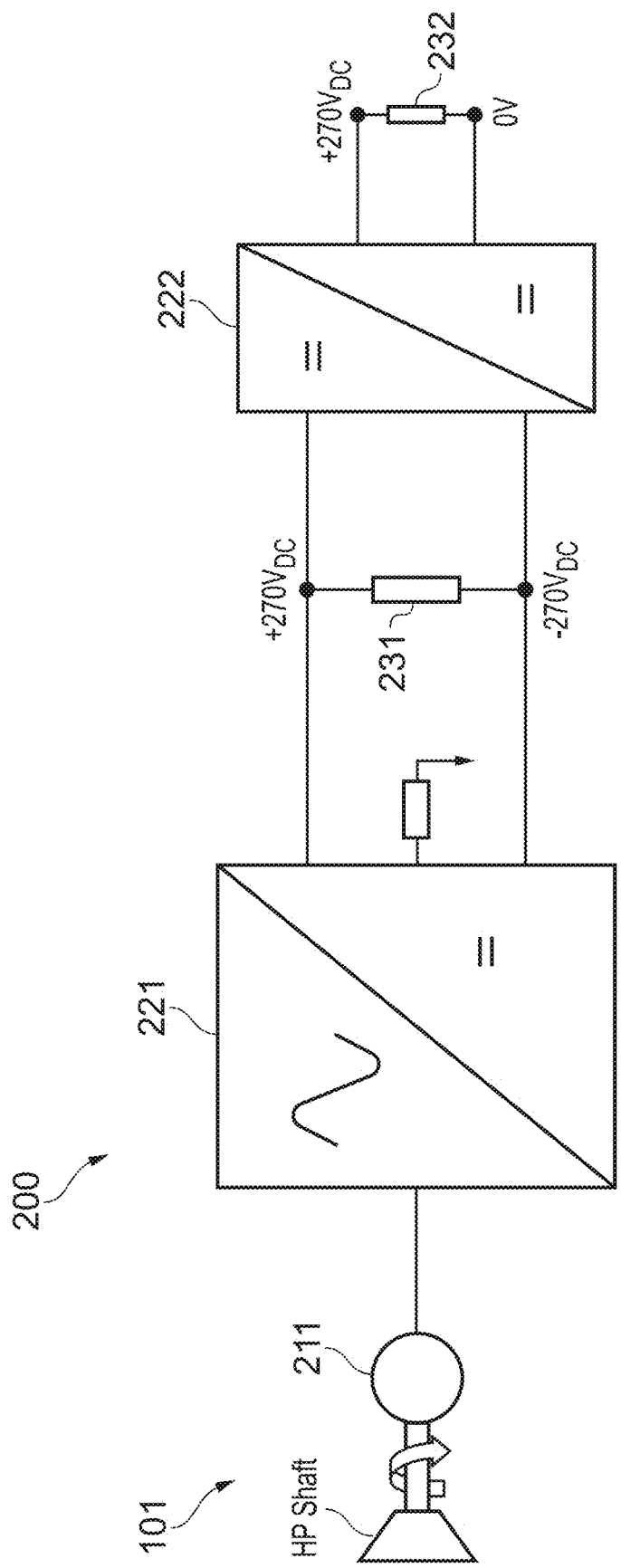
FIG. 2 is a schematic diagram of a portion of an aircraft power and propulsion system having two DC electrical networks having different operating voltages.

FIG. 2 illustrates a portion of an example aircraft power and propulsion system 200 having two DC electrical networks 231, 232 with different operating voltages (540 $V_{DC}$ and 270 $V_{DC}$ in this example) interfacing with a single electrical machine 211. In this case, the HP shaft is shown to be mechanically coupled with the rotor of the electrical machine 211. The first DC electrical network 231, operating at $540V_{DC}$ (or $+/-270V_{DC}$) is provided by an AC:DC converter 221, an AC-side of which is connected to the winding of the electrical machine 211. The second DC electrical network 232, operating at $270V_{DC}$, is provided by a DC:DC converter 222 connected between the first DC network 231 and the second DC network 232.

There are several drawbacks with the arrangement of FIG. 2. First, to supply the first and second DC networks 231, 232 with the same power, the AC:DC converter 221 needs to be rated at twice the power of the DC:DC converter 222. This increases the rating and weight of the AC:DC converter 221 beyond what is required to power the loads of the first network 231. Second, the DC:DC converter 222 adds weight to the system and is provided solely for converting between the voltage of the first DC network 231 and the voltage of the second DC network 232.

Figure 3:
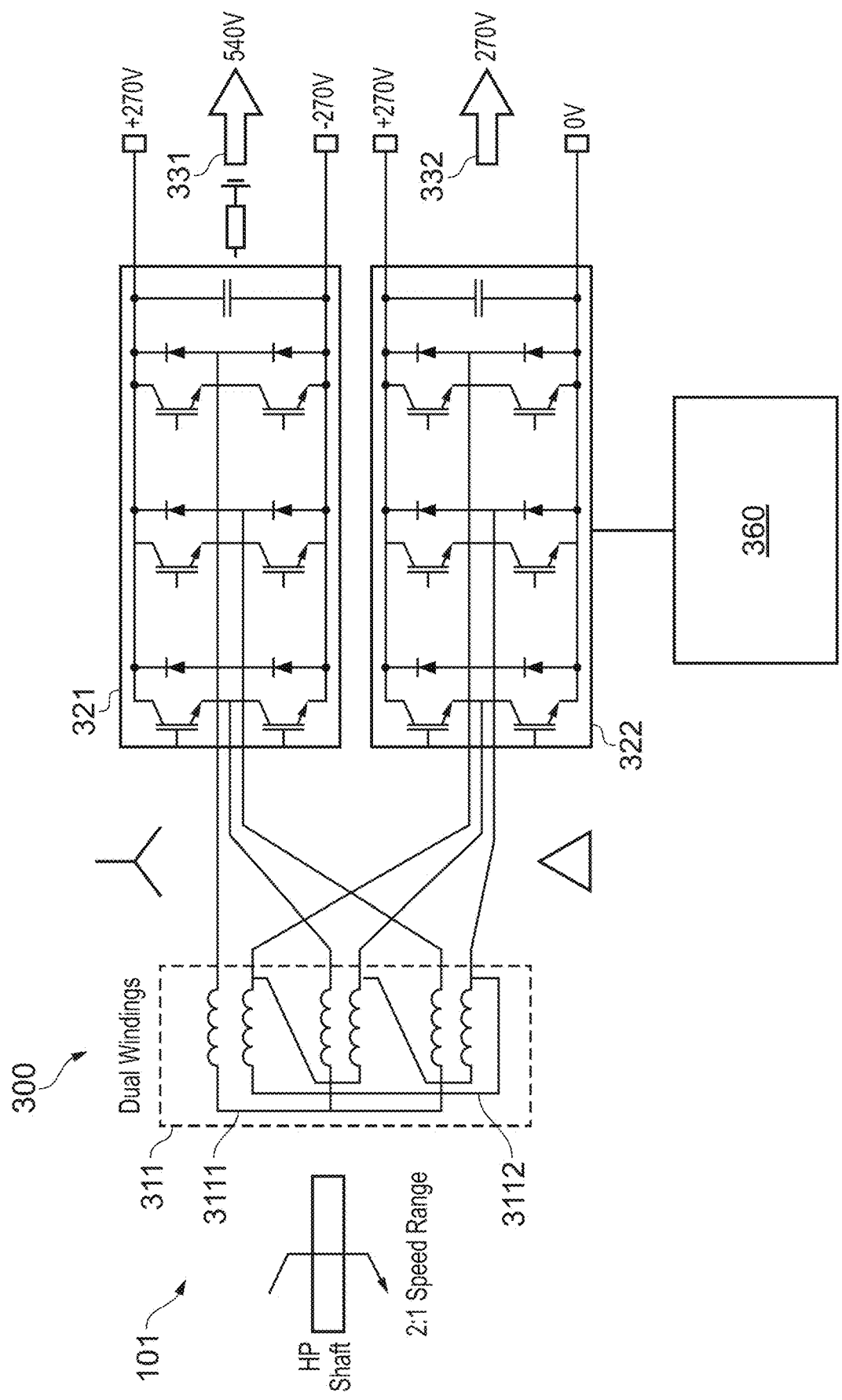
FIG. 3 is a schematic diagram of a portion of an aircraft power and propulsion system in which an electrical machine coupled to a spool of a gas turbine engine has two winding sets.

FIG. 3 illustrates a portion of another example aircraft power and propulsion system 300 having two DC electrical networks 331, 332 with different operating voltages (again, 540 $V_{DC}$ and 270 $V_{DC}$ in this example). This configuration is described in more detail in UK Patent Application No. 2209762.0 (filed 5 Jun. 2022) and European Patent Application No. 23177225.2 (filed 5 Jun. 2023), the entire content of both of which are incorporated herein by reference.

In this system 300, an electrical machine 311 includes a first winding set 3111 and a second winding set 3112. The two winding sets 3111, 3112 may, for example, be provided on a common stator, e.g., disposed in first and second circumferential spans around the stator, which may be non-overlapping circumferential spans over interleaved circumferential spans.

The first winding set 3111 is connected to an AC-side of a first AC:DC converter 321. The DC-side of the first AC:DC converter 321 is connected to a first DC electrical network 331, which has a first operating voltage of, e.g., 540 $V_{DC}$. The second winding set 3112 is connected to an AC-side of a second AC:DC converter 322. The DC-side of the second AC:DC converter 322 is connected to a second DC electrical network 332, which has a second operating voltage of, e.g., 270 $V_{DC}$.

In aerospace applications, the rotating shafts of a gas turbine engine 101 typically have large speed ranges (e.g., 2:1). The electrical machine 311 and converters 321, 322 must be capable of operating at their voltages (e.g., 540 $V_{DC}$ and 270 $V_{DC}$ at the DC sides) over the speed range. It may not be practical for the two half-converters 321, 322 illustrated in FIG. 3 to change the DC side voltage by control action alone to produce both 540 $V_{DC}$ and 270 $V_{DC}$ supplies in the presence of a large speed range. To this end, the first and second winding sets 3111, 3112 of the electrical machine 311 are configured to present different AC voltages to their respective AC:DC converter 321, 322. This reduces the amount of control action required to produce the different DC side voltages.

In the present example, the different AC voltages are achieved by connecting the first winding set 3111 is a star configuration and by connecting the second winding set 3112 in a delta configuration. If the configuration of the two winding sets (e.g., number of turns) is otherwise the same, the first, star, winding set 3111 outputs a voltage that is $\sqrt{3}$ (about 1.732) times that of the second, delta, winding set 3112. This is quite close to the 2:1 voltage difference between the first and second DC networks 331, 332 and the 2:1 speed range typical of an HP shaft. The remaining difference in voltage (i.e., the difference between 1.732:1 and 2:1) can be provided by control action (e.g., field weakening control or by applying different switching patterns) implemented by the control system 360, and/or by using a different number of turns in the two winding sets. For example, the first winding set 3111 may have between 5% and 20% more turns than the second winding set 3112. The use of 15% more winding turns in the first winding set 3111 would result in very close to a 2:1 ratio of the AC side voltages; any remaining difference can easily be implemented using control action.

In other examples, the two winding sets 3111, 3112 may be connected in the same way, e.g., both star or both delta. In this case, the difference in AC-side voltage may be achieved by using different numbers of turns in each winding set. For instance, the first winding set 3111 may have up to 100% more turns than the second winding set 3112. A number fewer than 100% more turns (e.g., 10% to 75% more turns) may be suitable where the ratio between the DC-side voltages is smaller (e.g., 270 $V_{DC}$ and 405 $V_{DC}$) and/or the shaft speed range is smaller, as may be the case with e.g., an LP spool of a gas turbine engine 101.

In still other examples, the first and second winding sets 3111, 3112 of the electrical machine 311 are configured to present the same AC voltages to their respective AC:DC converter 321, 322. This may be preferred where the voltage difference between the two DC operating voltages in relatively small, and/or the speed range of the spool is limited, and the difference can be implemented using control action alone.

The two converters 321, 322 may have the same or similar power ratings. This is advantageous compared with the system 200 of FIG. 2, where the AC:DC converter 221 needs twice the power rating of the DC:DC converter 222 if the two DC networks 231, 232 are to provide the same power.

As noted previously, the electrical machine 311 may be used as an electric starter for the gas turbine engine 101. The DC electrical networks 331, 332 may receive electrical power from an external source, for example an on-board ESS, ground equipment or an APU, and supply power to the winding sets 3111, 3112 so that the electrical machine 311 produces a starting torque, $\tau_{start}$. However, if only one of the two networks 331, 332 receives power, e.g., because an on-board ESS only interfaces with one of the networks (e.g., the first DC network 331), it would be necessary for the first AC:DC converter 321 to have an output current rating sufficient to provide a large enough current for the electrical machine 331 to produce the starting torque, $\tau_{start}$ with only the first winding set 3111 powered. This may again result in a heavily over-rated AC:DC converter 321, adding to the weight of the system.

FIG. 4 illustrates an aircraft power and propulsion system 400 in accordance with some embodiments of the present disclosure.

The system 400 includes a gas turbine engine 101. The engine 101 is a two-spool engine having an HP spool and an LP spool. The HP spool is the designated starting spool of the engine 101. In other words, to start the engine 101, the HP spool is accelerated until it reaches a speed where the resulting airflow through the core of the engine 101 allows the combustion equipment 106 to be ignited. The HP spool is mechanically coupled to a rotor of a first electrical machine 411. The LP spool is mechanically coupled to a rotor of a second electrical machine 413. The mechanical couplings between the spools and electrical machines 411, 413 may be indirect (e.g., through an AGB of the engine 101) or direct (e.g., the electrical machines may be coaxial with and directly coupled to the engine shafts).

The first electrical machine 411 has a first winding set 4111 and a second winding set 4112. The terminals of the first winding set 4111 are connected to an AC-side of a first AC:DC converter 4211. The terminals of the second winding set 4112 are connected to an AC-side of a second AC:DC converter 4212. The DC-side of the first AC:DC converter 4211 is connected to a first DC electrical network 431, which has a first operating voltage. The DC-side of the second AC:DC converter 4212 is connected to a second DC electrical network 432, which has a second operating voltage different from the first operating voltage. In this example the first and second operating voltages are, again, 540 $V_{DC}$ and 270 $V_{DC}$, but other operating voltages could be chosen.

The second electrical machine 413 also has a first winding set 4131 and a second winding set 4132. The terminals of the first winding set 4113 are connected to an AC-side of a third AC:DC converter 4231. The terminals of the second winding set 4132 are connected to an AC-side of a fourth AC:DC converter 4232. The DC-side of the third AC:DC converter 4231 is connected to the first DC electrical network 431. The DC-side of the fourth AC:DC converter 4232 is connected to the second DC electrical network 432.

The electrical machines 411, 413 are configured in a similar manner to the electrical machine 311 of FIG. 3. In other words, the two winding sets of each electrical machine (e.g., the first winding set 4111 and second winding set 4112 of the first electrical machine 411) are configured to present different AC voltages to the AC sides of their respective AC:DC converters. In the present example, this is achieved by connecting the respective first windings sets 4111, 4131 in a star configuration, and connecting the respective second windings sets 4112, 4132 in a delta configuration. In other embodiments, the winding sets may additionally or alternatively have different numbers of winding turns.

Notably, the power and propulsion system 400 of FIG. 4 further includes a controllable switching arrangement 441, 443a-b and inductors 445. The controllable switching arrangement, which is controlled by a control system 460, allows the AC-side of the third AC:DC converter 4231 to be connected to either the first winding set 4131 of the second electrical machine 413 or to the second DC electrical network 432 via the inductors 445.

In the present example, the switching arrangement takes the form of sets of mechanical switches, e.g., contactors. In particular, the switching arrangement includes a first set of 3-pole contactors 441 for connecting and disconnecting the AC-side of the third AC:DC converter 4231 from the first winding 4131 of the second electrical machine. The switching arrangement further includes a second set of 3-pole contactors 443a for connecting and disconnecting the AC-side of the third AC:DC converter 4231 from the second DC electrical network 432, and a 1-pole contactor 443b for connecting the grounds of the first and second DC electrical networks 431, 432 (which may be nominally isolated). For each phase of the third AC:DC converter 4231, the connection between the AC-side of the converter 4231 and the second DC network 432 includes an inductor, i.e., there are three inductors 445 in the depicted 3-phase system.

During normal operation of the system 400, the first and second electrical machines 411, 413 and their associated AC:DC converters 4211, 4212, 4231, 4232 may operate as generators to extract mechanical power from the HP and LP spools and convert it to electrical power, which is supplied to the first and second electrical networks 431, 432. The first and second electrical machines 411, 413 may also operated in a motor mode to drive the HP and LP spools, by drawing power from the first and second DC electrical networks 431, 432. In both these modes, the first set of contactors 441 are closed and the second set of contactors 443a-b are open so that the AC-side of the third AC:DC converter 4231 is connected to the first winding set 4131 of the second electrical machine 413.

Now consider an engine start or restart attempt. In this case, a starting torque is to be applied to the designated starting spool, i.e., the HP spool. To this end, one or both of the winding sets 4111, 4112 of the first electrical machine 411 must receive electrical power from a power source. In this example, the power source is an energy storage system 450, e.g., a battery, that is connected to the first DC electrical network 431. The ESS 450 supplies power to the first, star-connected, winding set 4111 via the first DC electrical network 431 and the first AC:DC converter 4211. The ESS 450 cannot directly supply the second AC:DC converter 4212 with power because it is not directly connected to the second DC electrical network 432. However, in accordance with the present disclosure, the third AC:DC converter 4231, which would usually be idle during a start or restart attempt, may be redeployed as a DC:DC converter to supply the second AC:DC converter 4212 with electrical power for supply to the second, delta-connected, winding set 4112 of the first electrical machine 411. This may advantageously reduce or eliminate the need to overrate the first AC:DC converter 4211.

In more detail, consider one phase leg of the 2-level, 3-phase converter 4231. For each current flow direction, the phase leg includes a power semiconductor switch (e.g., a MOSFET) connected in parallel with a diode, which may either be a separate diode or a body diode of a MOSFET. The power semiconductor switch and diode are connected in parallel with a DC-link capacitor. Those skilled in the art will recognise that, aside from a source of inductance which is absent, these components can form a DC:DC converter circuit. Therefore, by connecting each phase leg of the AC-side of the AC:DC converter 4231 to the second DC electrical network 432 via an inductor 445, the third AC:DC converter 4231 may be operated as a DC:DC converter that converts between the operating voltages of the first and second DC electrical networks 431, 432. The inductor 445 may take any suitable form; its role is to provide inductance in the path between the AC-side of third AC:DC converter 4231 and the second DC electrical network 432.

A start or restart attempt may therefore proceed as follows. In response to a request to start or restart the engine 101, the control system 460 opens the first set of contactors 441 to isolate the third AC:DC converter 4231 from the second electrical machine 413. The control system 460 further closes the second sets of contactors 443a-b to connect the AC-side of the third AC:DC converter 4231 to the inductor 445 and to the second DC electrical network 432, and to connect the grounds of the two networks 431, 432. The ESS 450 is controlled to discharge and supply electrical power to the first DC electrical network 431. Electrical power is supplied from the first DC electrical network 431 to the first winding set 4111 of the first electrical machine 411 via the first AC:DC converter 4211. Electrical power is supplied from the first DC electrical network 431 to the second winding set 4112 of the first electrical machine 411 via the third AC:DC converter 4231 and the second AC:DC converter 4212, with the third AC:DC converter 4231 being operated as a DC:DC converter. With both the first and second winding sets 4111, 4112 of the first electrical machine 411 supplied with power, the starting torque is applied to the HP shaft, which is accelerated until the combustion equipment can be ignited.

Figure 5A:
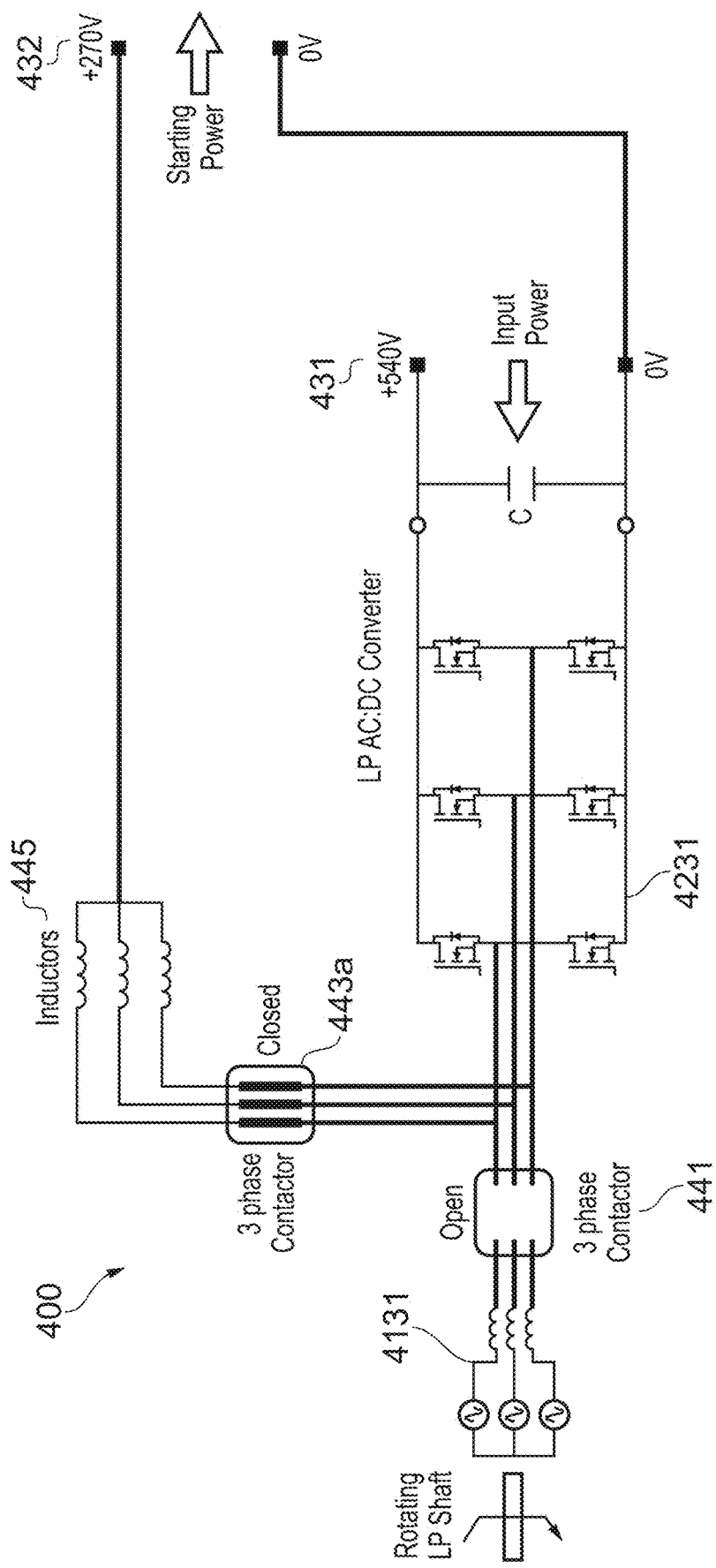
FIG. 5A shows how an AC:DC converter and inductor may be operated as a buck-mode DC:DC converter.

Thus, the first electrical machine 411 can supply the starting torque without, or with reduced, overrating of the first AC:DC converter 4211, and without the provision of either a second ESS connected the second DC electrical network 432 or a dedicated DC:DC converter for converting between the supply voltage of the ESS 450 and the second DC electrical network 432. Alternatively, if the rating of the first converter 4211 is not reduced, the electrical machine 411 is able to produce a higher staring torque without necessarily requiring any increase in the size of the first electrical machine. This increase in starting torque may be useful during abnormal conditions such as extreme cold or emergency restart. After the engine start or restart has been completed, it will be desirable to reconnect the AC-side of the third AC:DC converter 4231 to the first winding set 4131 of the second (LP) electrical machine 413 so that it can, e.g., generate electrical power. To reduce the risk of arcing of the contactors 443a-b when they are opened, the control system 460 may first control the switching state of the transistors (e.g., MOSFETs) of the third AC:DC converter 4231 to prevent current flow therethrough. For example, the control system 460 may turn off all active transistors before opening the second set of contactors 443a-b and closing the first set of contactors 441. With a relatively low voltage and AC frequency at the electrical machines 413 and a normal DC-side voltage, the converter diodes are reversed biased and so there is no prospect of uncontrolled diode conduction, allowing the contactors 443a-b to be opened at zero current, avoiding any arcing and minimizing wear. Once the second contactors 443a-b are open, the LP machine contactors 441 may be closed again without causing uncontrolled diode conduction. In the above description, the first DC electrical network 431 has a higher operating voltage than the second electrical network 432. The third AC:DC converter 4231, deployed as a DC:DC converter during engine start, therefore reduces the input voltage from that of the first DC electrical network (540 $V_{DC}$) to that of second DC electrical network (270 $V_{DC}$). Those skilled in the art will recognise this to be buck-mode (or step-down mode) operation of the DC:DC converter. FIG. 5A illustrates a portion of the system 400, again showing buck-mode operation of the third converter 4231.

Figure 5B:
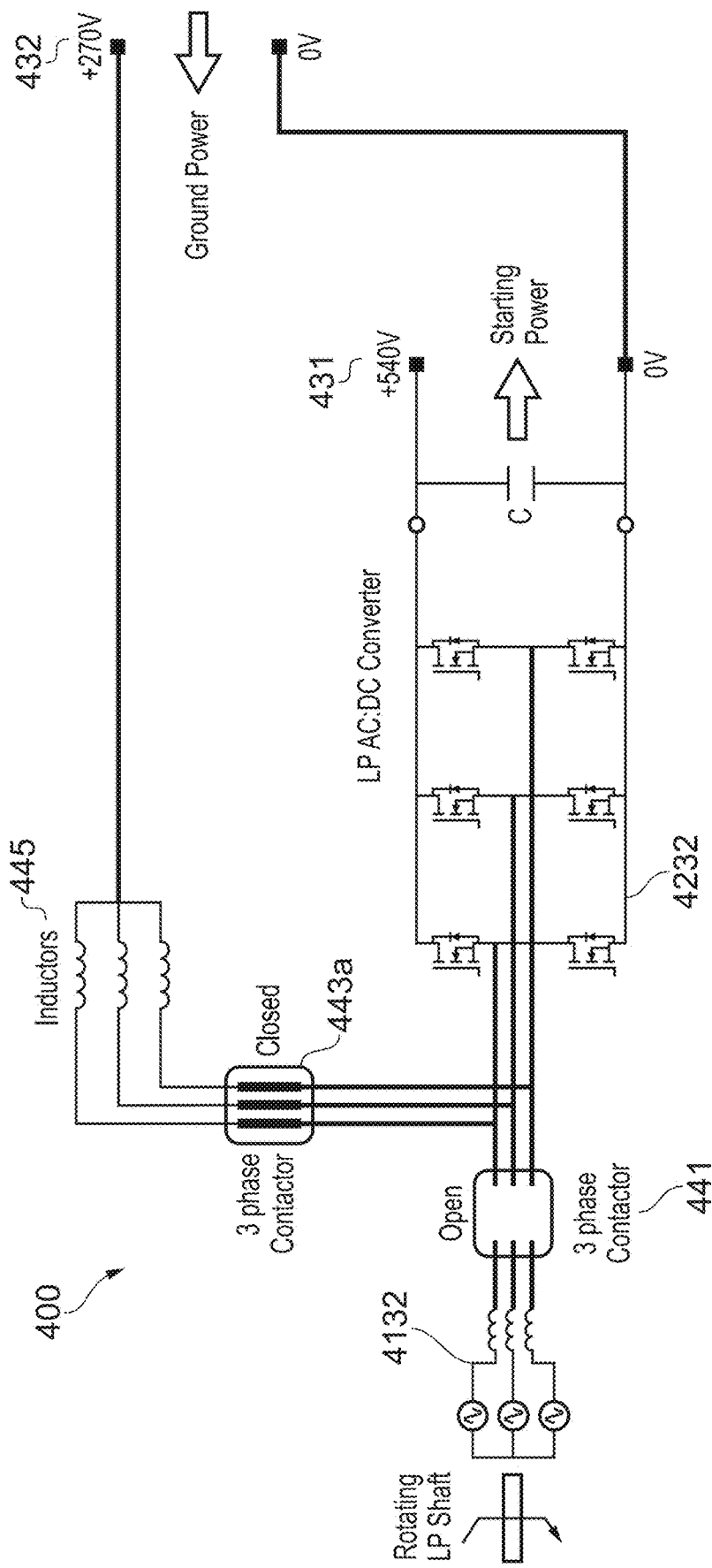
FIG. 5B shows how an AC:DC converter and inductor may be operated as a boost-mode DC:DC converter.

In other embodiments, the power source (e.g., ESS 450) may be connected to the second DC electrical network 432. In this case, rather than operating the third AC:DC converter 4231 as a buck-mode DC:DC converter, the fourth AC:DC converter 4232 may be operated as a boost-mode (or step-up mode) DC:DC converter. This is shown in FIG. 5B. It will be appreciated that this requires a switching arrangement 441, 443a-b and inductor 445 to be located as shown in FIG. 5B. In still other embodiments, the arrangement may be as shown in FIGS. 4 and 5A, but with the second operating voltage higher than the first operating voltage. In this case, the third AC:DC converter 4231 may be operated as a boost-mode DC:DC converter for engine starting.

Various modifications may be made to the systems 400 shown in FIGS. 4, 5A and 5B. These include:

Although a two-spool gas turbine engine 101 is illustrated, the engine could have a different number of spools. For example, the engine 101 may have three spools: an HP spool, an IP spool, and an LP spool. The two spools equipped with electrical machines may be the HP and LP spools, the HP and IP spools, or the IP and LP spools, with the HP and/or IP spool the designated starting spool. Alternatively, all three spools may be equipped with electrical machines and the HP and/or IP spools may be designated starting spools.

In the above description, the electrical machine 413 of the second (LP) spool, which is not a starting spool, is described as having two winding sets 4131, 4132. This is not essential: the invention may be implemented with a second electrical machine 413 that has only a single winding set. In this case, the fourth AC:DC converter 4232 may also be omitted. The electrical machine 413 may only be connected to a single one of the DC electrical networks (e.g., the first DC electrical network 431).

Where the second electrical machine 413 does have two winding sets 4131, 4132, these may have a different configuration to the winding sets 4111, 4112 of the first electrical machine 411. For example, the first electrical machine 411 may have star- and delta-connected winding sets 4111, 4112 to compensate for the large speed range of the HP spool. However, the winding sets 4131, 4132 of the second electrical machine 411 may have only have different numbers of turns, as this may be sufficient to compensate for the smaller speed range of the LP spool.

The switching arrangement 441, 443a-b may be implemented in many different ways. For example, the mechanical switches may be replaced by semiconductor switches, such as solid-state circuit breakers (SS-CBs). Different arrangements of switches for achieving the same function will also occur to those skilled in the art.

The operation of an AC:DC converter as DC:DC converter has only been described with reference to a 2-level, 3-phase AC:DC converter topology. However, the same principles apply for other AC:DC converter topologies, for example where each phase is implemented using an H-bridge circuit.

In a particular embodiment, the electrical machines 411, 413 are three-phase permanent magnet synchronous electrical machines in which the winding sets are stator windings. However, any suitable machine type and configuration may be used. Other suitable electrical machine types may include reluctance machines (switched and synchronous), induction and wound field type machines.

Whilst a 3-phase arrangement is illustrated, a different number of phases may be used. For example, there may be four phases.

Figure 6:
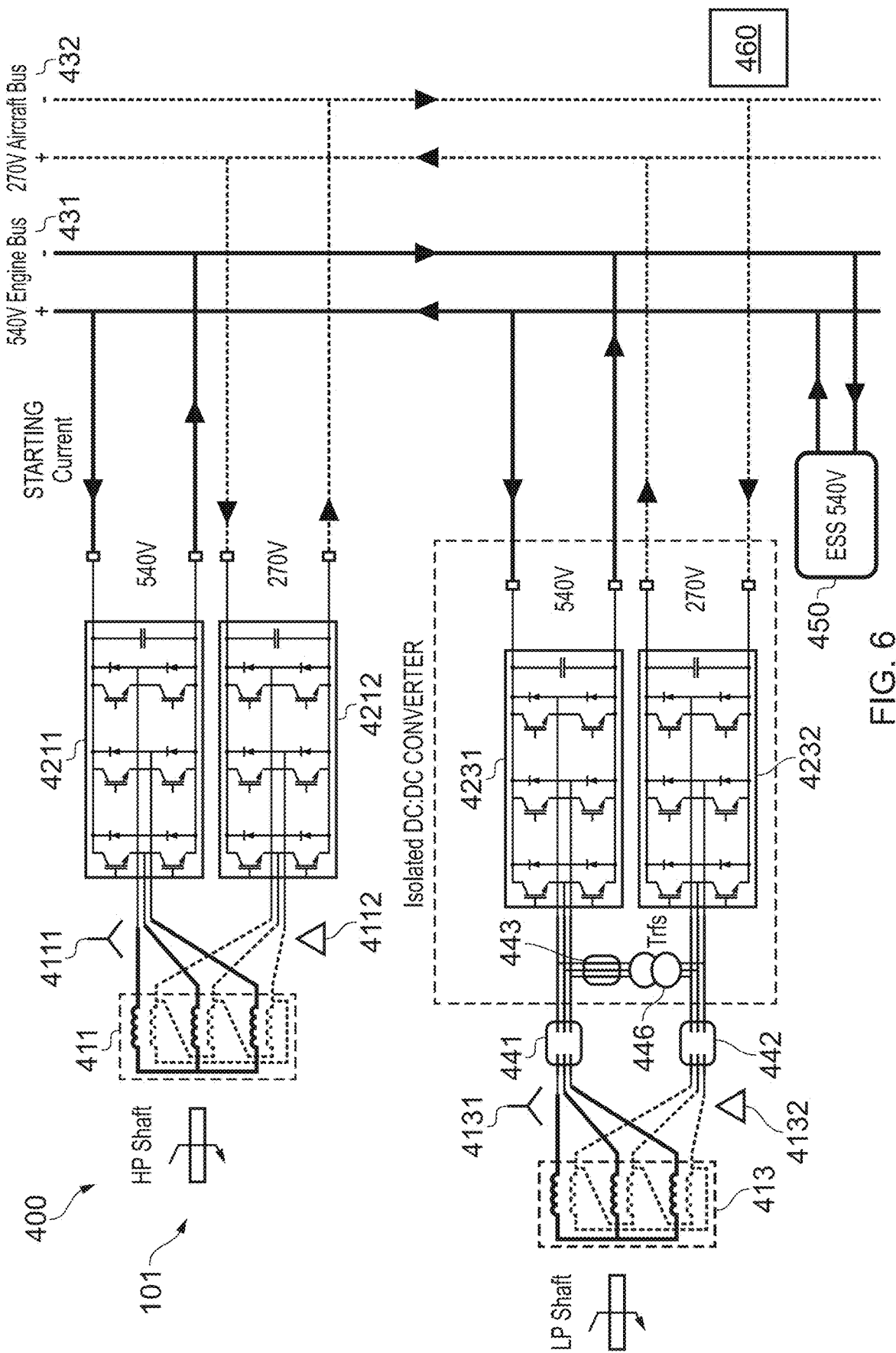
FIG. 6 shows an example aircraft power and propulsion system, illustrating the operation of two idle AC:DC converters and a transformer as a DC:DC converter to supply power to a winding set of an electrical machine coupled to a starting spool of a gas turbine engine.

Now turning to FIG. 6, this illustrates another embodiment of the power and propulsion system 400 of the present disclosure. The arrangement of the system 400 is similar to that of FIG. 4. The main difference is that, rather than operating one of the third and fourth AC:DC converters 4231, 4232 as an interleaved buck-or boost-mode DC:DC converter, the third and fourth AC:DC converters 4231, 4232 can be connected via a transformer 446 and operated as an isolated DC:DC converter (i.e., a DC:AC:DC converter).

In more detail, the controllable switching arrangement of FIG. 6 includes three sets of contactors, which as before may instead be implemented using solid state switches. There is a first set of contactors 441 that allow the AC-side of the third AC:DC converter 4231 to be connected to and disconnected from the first winding set 4131 of the second electrical machine 413. There is a second set of contactors 442 that allow the AC-side of the fourth AC:DC converter 4232 to be connected to and disconnected from the second winding set 4132 of the second electrical machine 413. There is also a third set of contactors 443 that allow the AC-sides of the third and fourth AC:DC converters 4231, 4232 to be connected together, via a transformer 446. The transformer 446 has a first winding connectable to the AC side of the third AC:DC converter 4231 and a second winding connectable to the AC side of the fourth AC:DC converter 4232.

The first and second windings of the transformer 446 are configured (e.g., in terms of turn number) to step-down the AC-side voltage of the third AC:DC converter 4231 to the AC-side voltage of the of fourth AC:DC converter 4232. Overall, by connecting the AC sides of the third and fourth AC:DC converters 4231, 4232 via the transformer 446, the resulting arrangement can be operated as an isolated DC:DC (DC:AC:DC) converter. This allows conversion between the first and second operating voltages of the first and second DC electrical networks 431, 432. The transformer 446 can take any suitable form, and this may depend on the selected AC:DC converter topology. In the illustrated system 400, there is a 3-phase AC link fed from a 3-phase AC:DC converter. In another example, there may be a 1-phase AC link fed from an H-bridge AC:DC converter.

A start or restart attempt may therefore proceed as follows. In response to a request to start or restart the engine 101, the control system 460 opens the first and second sets of contactors 441, 442 to isolate the third and fourth AC:DC converters 4231, 4232 from the second electrical machine 413. The control system 460 further closes the third set of contactors 443 to connect the AC-sides of the third and fourth AC:DC converters 4231, 4232 via the transformer 446. The ESS 450 is controlled to discharge and supply electrical power to the first DC electrical network 431. Electrical power is supplied from the first DC electrical network 431 to the first winding set 4111 of the first electrical machine 411 via the first AC:DC converter 4211. Electrical power is supplied from the first DC electrical network 431 to the second winding set 4112 of the first electrical machine 411 via the second, third and fourth AC:DC converters 4212, 4231, 4232, with the third and fourth AC:DC converters 4231, 4232 being operated as a DC:AC:DC converter. With both the first and second winding sets 4111, 4112 of the first electrical machine 411 supplied with power, the starting torque is applied to the HP shaft, which is accelerated until the combustion equipment can be ignited.

As before, after the engine start or restart has been completed, it will be desirable to reconnect the AC-sides of the third and fourth AC:DC converters 4231, 4232 to the first and second winding sets 4131, 4132 of the second (LP) electrical machine 413 so that it can, e.g., generate electrical power. As before, to reduce the risk of arcing of the contactors 443 when they are opened, the control system 460 may first control the switching state of the transistors (e.g., MOSFETs) of the third and fourth AC:DC converters 4231, 4232 to prevent current flow therethrough. For example, the control system 460 may turn off all active transistors before opening the third set of contactors 443 and closing the first and second sets of contactors 441, 442.

FIG. 6 shows the ESS 450 connected to the first DC electrical network 431, such that the isolated DC:DC converter steps down the voltage to the second operating voltage of the second DC electrical network. It will however be appreciated that the ESS 450 (or other power source, such as ground equipment) could instead be connected to the second DC electrical network 432 and the voltage stepped up.

Figure 7:
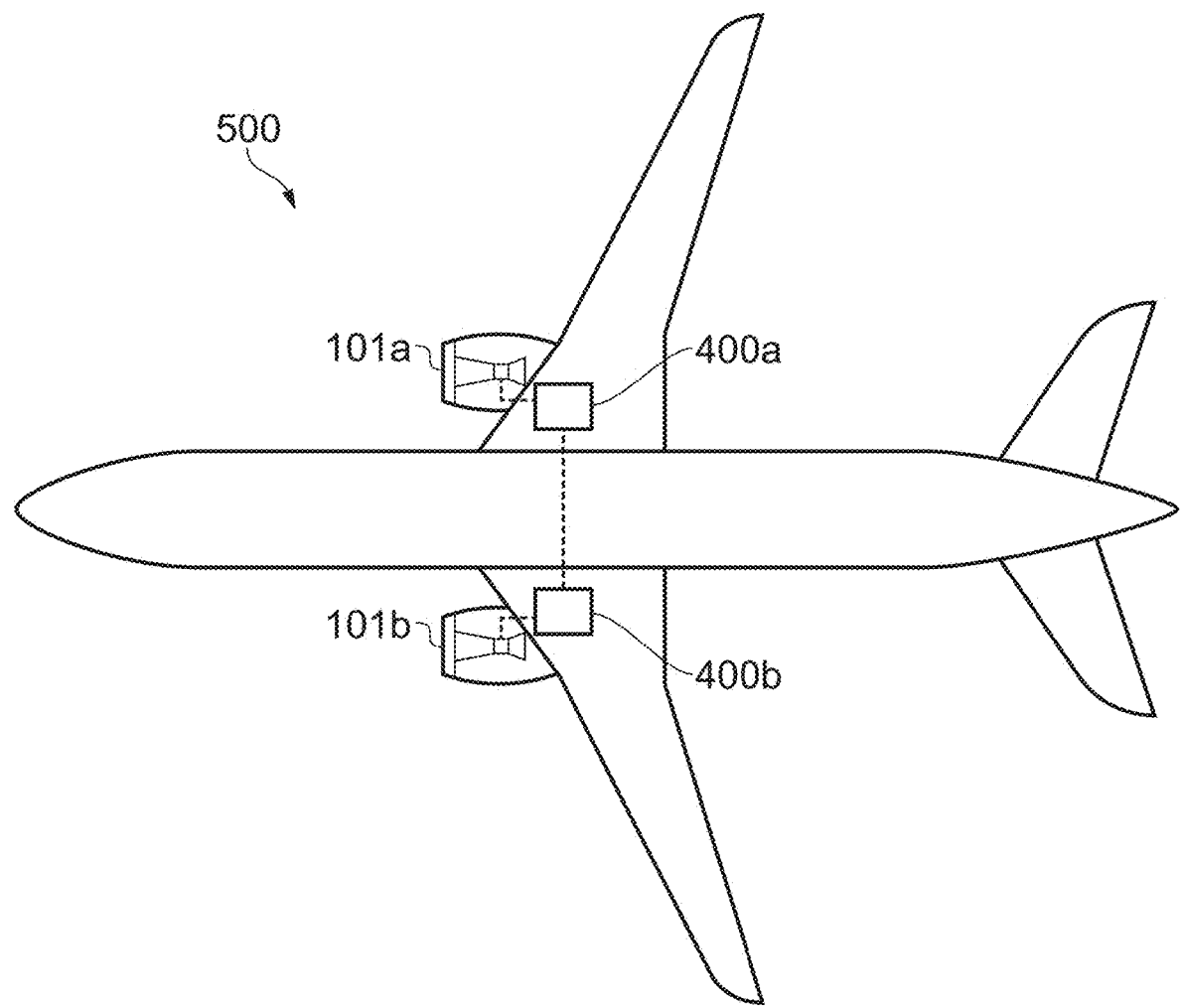
FIG. 7 is a schematic illustration of an aircraft comprising a power and propulsion system.

FIG. 7 illustrates an aircraft 500 comprising a first gas turbine engine 101a associated with a first power and propulsion system 400a and a second gas turbine engine 101b associated with a second power and propulsion system 400b. The gas turbine engines 101a, 101b may be of any suitable configuration, for example two-spool engines or three-spool engines. The power and propulsion systems 400a, 400b may be as described above with reference to FIGS. 4 to 6. FIG. 7 also shows, via dashed lines, that one or more of the DC electrical networks of the two power and propulsion systems 400a, 400b may optionally be electrically connected. Aircraft in accordance with the present disclosure may have one, two, or more than two gas turbine engines 101.

Figure 8:
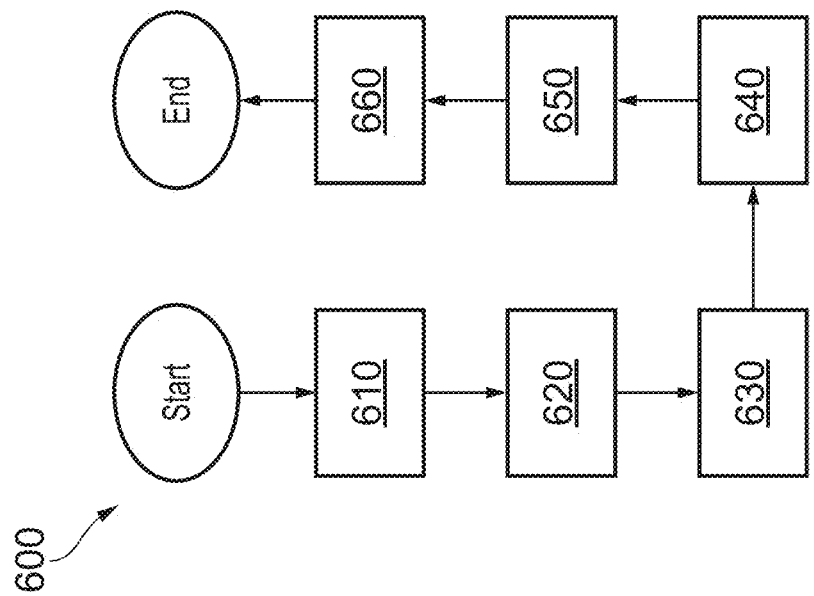
FIG. 8 is a flow chart illustrating a method of starting or restarting a gas turbine engine of an aircraft.

FIG. 8 is a flow chart illustrating a method 600 of starting a gas turbine engine 101 of an aircraft power and propulsion system 400. The gas turbine engine 101 may be of any suitable configuration, including a two-spool gas turbine engine or a three-spool gas turbine engine. The method 600 may be implemented by a control system 460, for example an EEC or FADEC, of the power and propulsion system 400 or aircraft 500. The power and propulsion system 400 may be of any of the types described above with reference to FIGS. 4, 5A, 5B and 6.

The method starts with the gas turbine engine 101 shut down. The aircraft 500 may be on the ground and the engine 101 shut down after a period of inactivity, or the aircraft 500 may be in-flight with the engine shut down either intentionally or following a flameout event.

At 610, the control system 460 receives a request to start or restart the engine 101. For example, a pilot of the aircraft 500 may initiate a start or restart procedure.

At 620, in response to the request, the control system 460 controls the switching arrangement to disconnect the AC side of the third AC:DC converter from a winding of the second electrical machine 413. The winding may be the sole winding of the second electrical machine 413, or may be one winding set (e.g., winding set 4131) of multiple winding sets of the second electrical machine 413. The control system further controls the switching arrangement to connect the AC side of the third AC:DC converter to the second DC electrical network 413, via an inductor. The inductor may take any suitable form. In one group of embodiments, the inductor takes the form of an inductor 445 on each phase connection between the AC side of the third AC:DC converter and the second DC electrical network 432, as in FIG. 4. In another group of embodiments, the inductor is a transformer 446 and the connection to the second DC electrical network 432 is made via a fourth AC:DC converter 4232, as in FIG. 6.

At 630, one or more electrical power sources supplies power to the first DC electric network 431. The power source may be an on-board ESS 450 (e.g., a battery pack), ground equipment, an APU of the aircraft 500 or another source.

At step 640, the first DC electrical network supplies electrical power to the first winding set 4111 of the first electrical machine 411 via the first AC:DC converter 4211. Thus, the first winding set 4111 of the first electrical machine 411 contributes to producing a starting torque for the first (e.g., HP) spool.

At step 650, the first DC electrical network supplies electrical power to the second winding set 4112 of the first electrical machine 411 via the second AC:DC converter 4212. To do so, the third AC:DC converter 4231 and the inductor are operated as a DC:DC converter that converts DC electrical power supplied by the first DC electrical network 431 at the first operating voltage to DC electrical power at the second operating voltage. This converted electrical power, at the second operating voltage, is then supplied to the DC-side of second AC:DC converter 4212, either directly or by supplying the second electrical network 432 to which the second AC:DC converter 4212 is connected. Thus, the second winding set 4112 of the first electrical machine 411 contributes to producing a starting torque for the first (e.g., HP) spool.

By supplying both the first and second winding sets 4111, 4112 of the first electrical machine, the first and second AC:DC converters 4211, 4212 may have lower output current and power ratings than would be required if only one of the windings sets was powered during the engine start procedure. Additionally or alternatively, the first electrical machine 411 can supply a higher starting torque.

Step 650 continues until the first, starting, spool reaches a rotational speed sufficient to light the combustion equipment of the engine.

At 660, with the engine started, the control system controls the switching arrangement to disconnect the AC-side of the third power converter 4231 from the second DC electrical network 432 and the inductor, and to connect the AC-side of the third AC:DC converter 4231 to the winding of the second electrical machine 413. Optionally, to reduce the risk of contactor arcing, the control system 460 may first stop all current flow through the third AC:DC converter 4231, for example by controlling a switching state of one or more transistors of the third power converter 4231.

Figure 9:
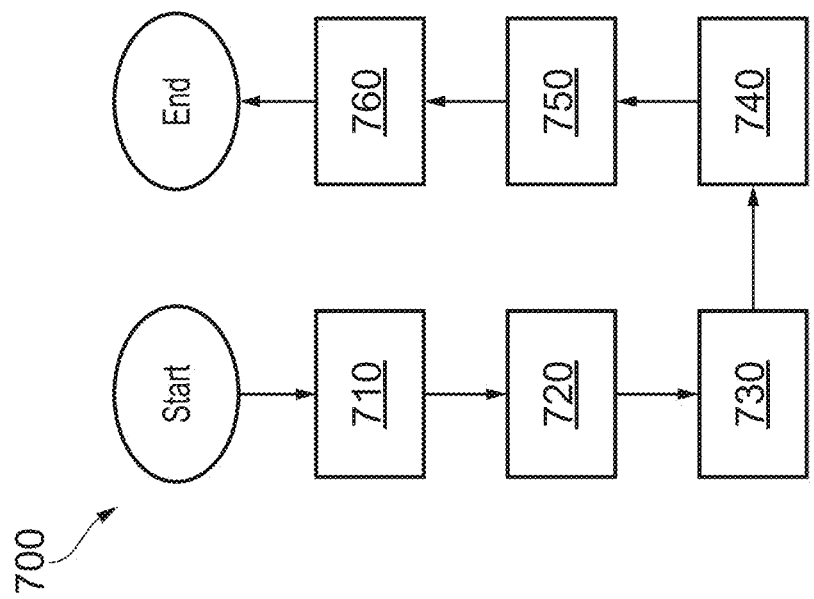
FIG. 9 is a flow chart illustrating another method of starting or restarting a gas turbine engine of an aircraft.

FIG. 9 is a flow chart illustrating a method 700 of starting a gas turbine engine 101 of an aircraft power and propulsion system 400. The gas turbine engine 101 may be of any suitable configuration, including a two-spool gas turbine engine or a three-spool gas turbine engine. The method 700 may be implemented by a control system 460, for example an EEC or FADEC, of the power and propulsion system 400 or aircraft 500. The power and propulsion system 400 is of the type described above with reference to FIG. 6, in which the second electrical machine 413 has two sets of windings 4131, 4132 and the associated AC:DC converters 4231, 4232 are connectable via a transformer 446.

The method starts with the gas turbine engine 101 shut down. The aircraft 500 may be on the ground and the engine 101 shut down after a period of inactivity, or the aircraft 500 may be in-flight with the engine shut down either intentionally or following a flameout event.

At 710, the control system 460 receives a request to start or restart the engine 101. For example, a pilot of the aircraft 500 may initiate a start or restart procedure.

At 720, in response to the request, the control system 460 controls the switching arrangement to disconnect the AC side of the third AC:DC converter 4231 from the first winding 4131 of the second electrical machine 413, and to connect the AC side of the third AC:DC converter 4231 to the first winding of the transformer 446. The control system further controls the switching arrangement to disconnect the AC side of the fourth AC:DC converter 4232 from the second winding 4132 of the second electrical machine 413. The control system further controls the switching arrangement to connect the AC side of the fourth AC:DC converter 4232 to the second winding of the transformer 446.

At 730, one or more electrical power sources supplies power to the first DC electric network 431. The power source may be an on-board ESS 450 (e.g., a battery pack), ground equipment, an APU of the aircraft 500 or another source.

At step 740, the first DC electrical network supplies electrical power to the first winding set 4111 of the first electrical machine 411 via the first AC:DC converter 4211. Thus, the first winding set 4111 of the first electrical machine 411 contributes to producing a starting torque for the first (e.g., HP) spool.

At step 750, the first DC electrical network supplies electrical power to the second winding set 4112 of the first electrical machine 411 via the second AC:DC converter 4212. To do so, the third and fourth AC:DC converters 4231, 4232, together with the transformer 446, are operated as an isolated DC:DC converter that converts DC electrical power supplied by the first DC electrical network 431 at the first operating voltage to DC electrical power at the second operating voltage. This converted electrical power, at the second operating voltage, is then supplied to the DC-side of second AC:DC converter 4212, either directly or by supplying the second electrical network 432 to which the second AC:DC converter 4212 is connected. Thus, the second winding set 4112 of the first electrical machine 411 contributes to producing a starting torque for the first (e.g., HP) spool.

By supplying both the first and second winding sets 4111, 4112 of the first electrical machine, the first and second AC:DC converters 4211, 4212 may have lower output current and power ratings than would be required if only one of the windings sets was powered during the engine start procedure. Additionally or alternatively, the first electrical machine 411 can supply a higher starting torque.

Step 750 continues until the first, starting, spool reaches a rotational speed sufficient to light the combustion equipment of the engine.

At 760, with the engine started, the control system controls the switching arrangement to disconnect the AC-side of the third power converter 4231 from the second DC electrical network 432 and the inductor, and to connect the AC-side of the third AC:DC converter 4231 to the winding of the second electrical machine 413. Optionally, to reduce the risk of contactor arcing, the control system 460 may first stop all current flow through the third AC:DC converter 4231, for example by controlling a switching state of one or more transistors of the third power converter 4231.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An aircraft power and propulsion system, comprising:
a gas turbine engine having a first spool and a second spool, the first spool being a designated starting spool;
a first DC electrical network having a first operating voltage;
a second DC electrical network having a second operating voltage different from the first operating voltage;
a first electrical machine mechanically coupled with the first spool, the first electrical machine having a first winding set and a second winding set;
a second electrical machine mechanically coupled with the second spool;
a first AC:DC converter, wherein an AC-side of the first AC:DC converter is connected to the first winding set of the first electrical machine, and a DC-side of the first AC:DC converter is connected to the first DC electrical network;
a second AC:DC converter, wherein an AC-side of the second AC:DC converter is connected to the second winding set of the first electrical machine, and a DC-side of the second AC:DC converter connected to the second DC electrical network;
a third AC:DC converter, a DC-side of the third AC:DC converter connected to the first DC electrical network;
a controllable switching arrangement configured so that a connection to an AC-side of the third AC:DC converter is switchable between:
a winding of the second electrical machine; and
the second DC electrical network via an inductor.

2. The aircraft power and propulsion system of claim 1, wherein:
the first electrical machine is rated to produce at least a rated starting torque, tstart, of the engine; and
a current required by the first winding set of the first electrical machine to produce the starting torque is greater than a rated current output of the first AC:DC converter.

3. The aircraft power and propulsion system of claim 1, wherein:
the first operating voltage is greater than the second operating voltage, and wherein the third AC:DC converter is operable as a buck-mode DC:DC converter; or
the first operating voltage is lower than the second operating voltage, and wherein the third AC:DC converter is operable as a boost-mode DC:DC converter.

4. The aircraft power and propulsion system of claim 1, comprising a control system configured to:
in response to a request to start or restart the gas turbine engine, control the switching arrangement to disconnect the AC-side of the third AC:DC converter from the winding of the second electrical machine and to connect the AC-side of the third AC:DC converter to the second DC electrical network; and
operate the third AC:DC converter and inductor as a DC:DC converter.

5. The aircraft power and propulsion system of claim 1, comprising a control system configured to:
following an engine start or restart, stop current flow through the third AC:DC converter by controlling a switching state of one or more transistors of the third AC:DC converter; and
after stopping current flow through the third AC:DC converter, controlling the switching arrangement to disconnect the AC-side of the third AC:DC converter from the second DC electrical network and the inductor, and to connect the AC-side of the third AC:DC converter to the winding of the second electrical machine.

6. The aircraft power and propulsion system of claim 1, wherein the first winding set of the first electrical machine has a first number of turns, and the second winding set of the first electrical machine has a second number of turns different from the first number of turns.

7. The aircraft power and propulsion system of claim 1, wherein the first winding set of the first electrical machine is connected in a star configuration, and the second winding set of the first electrical machine is connected in a delta configuration.

8. The aircraft power and propulsion system of claim 1, wherein:
the winding of the second electrical machine is a first winding set of the second electrical machine;
the second electrical machine further comprises a second winding set; and
the aircraft power and propulsion system further comprises a fourth AC:DC converter, wherein an AC-side of the fourth AC:DC converter is connected to the second winding set of the second electrical machine, and a DC-side of the fourth AC:DC converter is connected to the second DC electrical network.

9. The aircraft power and propulsion system of claim 8, wherein the first winding set of the second electrical machine has a first number of turns, and the second winding set of the second electrical machine has a second number of turns different from the first number of turns.

10. The aircraft power and propulsion system of claim 8, wherein the first winding set of the second electrical machine is connected in a star configuration, and the second winding set of the second electrical machine is connected in a delta configuration.

11. The aircraft power and propulsion system of claim 8, wherein:
the inductor is a transformer having a first winding and a second winding;
the controllable switching arrangement is configured so that:
the connection to the AC-side of the third AC:DC converter is switchable between the first winding set of the second electrical machine and the first winding of the transformer; and
the connection to the AC-side of the fourth AC:DC converter is switchable between the second winding set of the second electrical machine and the second winding of the transformer.

12. The aircraft power and propulsion system of claim 11, comprising a control system configured to, in response to a request to start or restart the gas turbine engine:
control the switching arrangement to disconnect the AC-side of the third AC:DC converter from the first winding set of the second electrical machine and to connect the AC-side of the third AC:DC converter to the first winding of the transformer;
control the switching arrangement to disconnect the AC-side of the fourth AC:DC converter from the second winding set of the second electrical machine and to connect the AC-side of the fourth AC:DC converter to the second winding of the transformer; and
operate the third AC:DC converter, the fourth AC:DC converter and the transformer as a DC:DC converter.

13. The aircraft power and propulsion system of claim 11, comprising a control system configured to:
following an engine start or restart, stop current flow through the third and fourth AC:DC converters by controlling a switching state of one or more transistors of each of the third and further AC:DC converters; and
after stopping current flow through the third and fourth AC:DC converters:
controlling the switching arrangement to disconnect the AC-side of the third AC:DC converter from the first winding of the transformer and to disconnect the AC-side of the fourth AC:DC converter from the second winding of the transformer; and
controlling the switching arrangement to connect the AC-side of the third AC:DC converter to the first winding set of the second electrical machine and to connect the AC-side of the fourth AC:DC converter to the second winding set of the second electrical machine.

14. The aircraft power and propulsion system of claim 1, wherein:
the gas turbine engine is a two-spool gas turbine engine, the first spool is a high-pressure spool, and the second pool is a low-pressure spool; or
the gas turbine engine is a three-spool gas turbine engine, the first spool is an high pressure (HP) spool, and the second spool is an intermediate-pressure (IP) spool or low pressure (LP) spool; or
the gas turbine engine is a three-spool gas turbine engine, the first spool is an IP spool, and the second pool is an LP spool.

15. The aircraft power and propulsion system of claim 1, further comprising an energy storage system connected to and configured to supply electrical power to one of the first and second DC electrical networks.

16. The aircraft power and propulsion system of claim 1, wherein the controllable switching arrangement comprises mechanical contactors or solid-state circuit breakers.

17. The aircraft power and propulsion system of claim 1, wherein each respective electrical machine is a permanent magnet synchronous electrical machine, the respective winding sets being stator windings.

18. An aircraft comprising an aircraft power and propulsion system according to claim 1.

19. A method of starting a gas turbine engine of an aircraft power and propulsion system, the aircraft power and propulsion system comprising:
- a gas turbine engine having a first spool and a second spool, the first spool being a designated starting spool;
- a first DC electrical network having a first operating voltage;
- a second DC electrical network having a second operating voltage different from the first operating voltage;
- a first electrical machine mechanically coupled with the first spool, the first electrical machine having a first winding set and a second winding set;
- a second electrical machine mechanically coupled with the second spool;
- a first AC:DC converter, wherein an AC-side of the first AC:DC converter is connected to the first winding set of the first electrical machine, and a DC-side of the first AC:DC converter is connected to the first DC electrical network;
- a second AC:DC converter, wherein an AC-side of the second AC:DC converter is connected to the second winding set of the first electrical machine, and a DC-side of the second AC:DC converter connected to the second DC electrical network;
- a third AC:DC converter, a DC-side of the third AC:DC converter connected to the first DC electrical network; and a controllable switching arrangement, the method comprising:
- receiving, by a control system of the power and propulsion system, a request to start or restart the gas turbine engine;
- controlling the switching arrangement to disconnect the AC side of the third AC:DC converter from the winding of the second electrical machine and to connect the AC side of the third AC:DC converter to the second DC electrical network;
- supplying electrical power from one or more electrical power sources to the first DC electrical network; and
- supplying electrical power from the first DC electrical network to the first winding set of the first electrical machine via the first AC:DC converter;
- supplying electrical power from the first DC electrical network to the second winding set of the first electrical machine via the second AC:DC converter by operating the third AC:DC converter and the inductor as a DC:DC converter that converts DC electrical power supplied by the first DC electrical network at the first operating voltage to DC electrical power at the second operating voltage.

20. A method of starting a gas turbine engine of the aircraft power and propulsion system, the aircraft power and propulsion system comprising:
- a gas turbine engine having a first spool and a second spool, the first spool being a designated starting spool;
- a first DC electrical network having a first operating voltage;
- a second DC electrical network having a second operating voltage different from the first operating voltage;
- a first electrical machine mechanically coupled with the first spool, the first electrical machine having a first winding set and a second winding set;
- a second electrical machine mechanically coupled with the second spool, the second electrical machine having a first winding set and a second winding set;
- a first AC:DC converter, wherein an AC-side of the first AC:DC converter is connected to the first winding set of the first electrical machine, and a DC-side of the first AC:DC converter is connected to the first DC electrical network;
- a second AC:DC converter, wherein an AC-side of the second AC:DC converter is connected to the second winding set of the first electrical machine, and a DC-side of the second AC:DC converter connected to the second DC electrical network;
- a third AC:DC converter, a DC-side of the third AC:DC converter connected to the first DC electrical network;
- a fourth AC:DC converter, wherein an AC-side of the fourth AC:DC converter is connected to the second winding set of the second electrical machine, and a DC-side of the fourth AC:DC converter is connected to the second DC electrical network; and
- a controllable switching arrangement, the method comprising:
- receiving, by a control system of the power and propulsion system, a request to start or restart the gas turbine engine;
- controlling the switching arrangement to disconnect the AC side of the third AC:DC converter from the first winding set of the second electrical machine and to connect the AC side of the third AC:DC converter to the first winding of the transformer;
- controlling the switching arrangement to disconnect the AC side of the fourth AC:DC converter from the second winding set of the second electrical machine and to connect the AC side of the fourth AC:DC converter to the second winding of the transformer;
- supplying electrical power from one or more electrical power sources to the first DC electrical network; and
- supplying electrical power from the first DC electrical network to the first winding set of the first electrical machine via the first AC:DC converter;
- supplying electrical power from the first DC electrical network to the second winding set of the first electrical machine via the second AC:DC converter by operating the third AC:DC converter, the fourth AC:DC converter and the transformer as a DC:DC converter that converts DC electrical power supplied by the first DC electrical network at the first operating voltage to DC electrical power at the second operating voltage.

* * * * *